United States Patent
Parmar et al.

(10) Patent No.: US 11,698,819 B2
(45) Date of Patent: Jul. 11, 2023

(54) SYSTEM AND METHOD FOR SCALING RESOURCES OF A SECONDARY NETWORK FOR DISASTER RECOVERY

(71) Applicant: VMWARE, INC., Palo Alto, CA (US)

(72) Inventors: Piyush Parmar, Pune (IN); Anant Agarwal, San Jose, CA (US); Vikram Nair, Palo Alto, CA (US); Aalap Desai, Palo Alto, CA (US); Rahul Chandrasekaran, Palo Alto, CA (US); Ravi kant Cherukupalli, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 85 days.

(21) Appl. No.: 17/337,524

(22) Filed: Jun. 3, 2021

(65) Prior Publication Data
US 2022/0318062 A1   Oct. 6, 2022

(30) Foreign Application Priority Data
Apr. 1, 2021   (IN) .............. 202141015615

(51) Int. Cl.
*G06F 11/20*   (2006.01)
*G06F 9/50*   (2006.01)
*G06F 11/34*   (2006.01)

(52) U.S. Cl.
CPC ............ *G06F 9/505* (2013.01); *G06F 9/5016* (2013.01); *G06F 11/203* (2013.01); *G06F 11/3414* (2013.01); *G06F 11/3452* (2013.01)

(58) Field of Classification Search
CPC ...... G06F 11/203; G06F 9/505; G06F 9/5016; H04L 41/0663; H04L 41/0668
See application file for complete search history.

(56) References Cited

U.S. PATENT DOCUMENTS

| | | | |
|---|---|---|---|
| 2003/0065861 A1* | 4/2003 | Clark | G06F 11/20 710/305 |
| 2015/0088586 A1* | 3/2015 | Pavlas | G06F 9/45533 718/1 |
| 2016/0048408 A1* | 2/2016 | Madhu | H04L 47/783 718/1 |
| 2017/0063674 A1* | 3/2017 | Maskalik | H04L 12/66 |
| 2020/0076684 A1* | 3/2020 | Naveen | H04L 49/355 |
| 2020/0089587 A1* | 3/2020 | Tolstoy | G06F 11/2023 |

* cited by examiner

*Primary Examiner* — Yolanda L Wilson
(74) *Attorney, Agent, or Firm* — Loza & Loza, LLP

(57) ABSTRACT

A system and method for scaling resources of a secondary network for disaster recovery uses a disaster recovery notification from a primary resource manager of a primary network to a secondary resource manager of the secondary network to generate a scale-up recommendation for additional resources to the secondary network. The additional resources are based on latest resource demands of workloads on the primary network included in the disaster recovery notification. A scale-up operation for the additional resources is then executed based on the scale-up recommendation from the secondary resource manager to operate the secondary network with the additional resources to run the workloads on the secondary network.

20 Claims, 6 Drawing Sheets

SYSTEM AND METHOD FOR SCALING RESOURCES OF A SECONDARY NETWORK FOR DISASTER RECOVERY

RELATED APPLICATIONS

Benefit is claimed under 35 U.S.C. 119(a)-(d) to Foreign Application Serial No. 202141015615 filed in India entitled "SYSTEM AND METHOD FOR SCALING RESOURCES OF A SECONDARY NETWORK FOR DISASTER RECOVERY", on Apr. 1, 2021, by VMware, Inc., which is herein incorporated in its entirety by reference for all purposes.

BACKGROUND

Cloud architectures can be used in cloud computing and cloud storage systems for offering software as a service (SaaS) cloud services. Examples of cloud architectures include the VMware Cloud architecture software, Amazon EC2™ web service, and OpenStack™ open source cloud computing service. SaaS cloud service is a type of software distribution cloud service in which a service provider hosts software applications for customers in a cloud environment.

With increasing adaptation of cloud computing and cloud storage by enterprises, enterprise information technology (IT) solutions for operations and automation are increasingly delivered as SaaS, with abilities to function across public clouds and on-premises. One of the uses of cloud computing and cloud storage is for disaster recovery. As an example, a small software-defined data center (SDDC) may be deployed in a public cloud to serve as a disaster recovery site for an on-premises data center (DC). In this example, if a disaster occurs at the on-premises DC, the SDDC on the public cloud can be scaled up by an automatic cluster scaling algorithm to handle the workload of the on-premises DC. However, a conventional automatic cluster scaling algorithm typically uses statistical measures based on resource usage for scale-up operations. For disaster recovery cases, the use of statistical measures for scaling up a backup SDDC on the public cloud may not be efficient with respect to speed and resource management.

SUMMARY

A system and method for scaling resources of a secondary network for disaster recovery uses a disaster recovery notification from a primary resource manager of a primary network to a secondary resource manager of the secondary network to generate a scale-up recommendation for additional resources to the secondary network. The additional resources are based on latest resource demands of workloads on the primary network included in the disaster recovery notification. A scale-up operation for the additional resources is then executed based on the scale-up recommendation from the secondary resource manager to operate the secondary network with the additional resources to run the workloads on the secondary network.

A computer-implemented method for scaling resources of a secondary network for disaster recovery in accordance with an embodiment of the invention comprises, in response to a disaster recovery event at a primary network, transmitting a disaster recovery notification to a secondary resource manager of the secondary network from a primary resource manager of the primary network, the disaster recovery notification including latest resource demands of workloads on the primary network, generating a scale-up recommendation for additional resources to the secondary network by the secondary resource manager based on the latest resource demands of the workloads on the primary network included in the disaster recovery notification, executing a scale-up operation for the additional resources to the secondary network based on the scale-up recommendation from the secondary resource manager, and operating the secondary network with the additional resources to run the workloads on the secondary network. In some embodiments, the steps of this method are performed when program instructions contained in a non-transitory computer-readable storage medium are executed by one or more processors.

A system in accordance with an embodiment of the invention comprises memory, and at least one processor configured to, in response to a disaster recovery event at a primary network of the system, transmit a disaster recovery notification to a secondary resource manager of a secondary network of the system from a primary resource manager of the primary network, the disaster recovery notification including latest resource demands of workloads on the primary network, generate a scale-up recommendation for additional resources to the secondary network by the secondary resource manager based on the latest resource demands of the workloads on the primary network included in the disaster recovery notification, execute a scale-up operation for the additional resources to the secondary network based on the scale-up recommendation from the secondary resource manager, and operate the secondary network with the additional resources to run the workloads on the secondary network.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
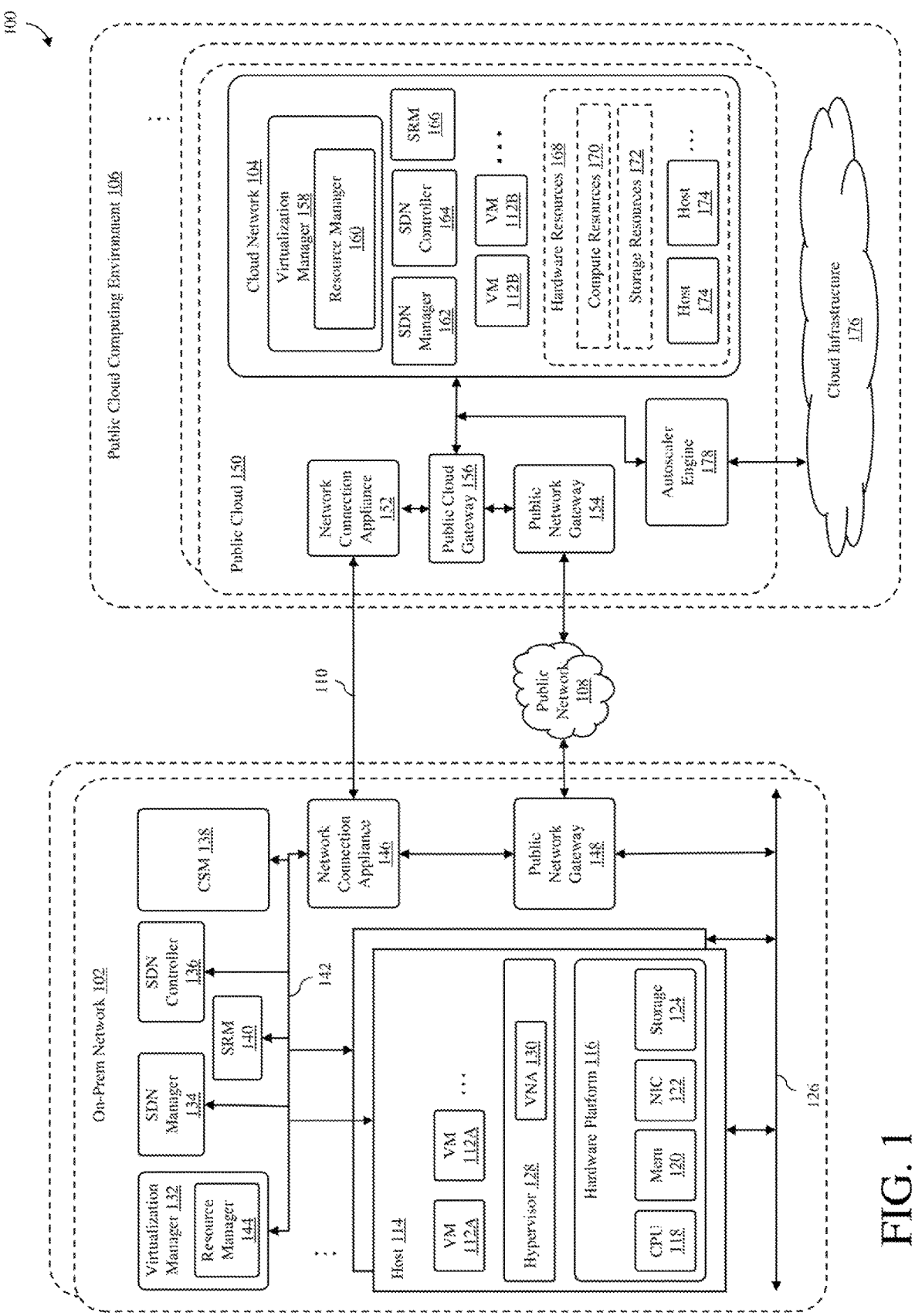
FIG. 1 is a block diagram of a hybrid cloud system in accordance with an embodiment of the invention.

Turning now to FIG. 1, a block diagram of a hybrid cloud system 100 having automatic scaling capabilities for disaster recovery in accordance with an embodiment of the invention is shown. The hybrid cloud system includes at least one on-premises (on-prem) network 102, which operates as a primary site with respect to disaster recovery purposes, and a cloud network 104 in a public cloud computing environment 106, which operates as a secondary or backup site for the on-prem network 102 for disaster recovery purposes. In an embodiment, the on-prem network 102 and the cloud network 104 may be software-defined data centers (SDDCs). As explained below, the hybrid cloud system 100 includes mechanisms to rapidly scale up the secondary site, e.g., the cloud network 104, when a disaster recovery event occurs at the primary site, e.g., the on-prem network. Thus, the secondary site is able to quickly handle the workload of the primary site in response to a disaster recovery event, which can be any event, e.g., software and/or hardware failure, that interrupts the operations at the primary site.

As illustrated in FIG. 1, the on-prem network 102 and the public cloud computing environment 106, which includes the cloud network 104, may be connected via a network 108 or a direction connection 110. The hybrid cloud system 100 is configured to provide a common platform for managing and executing workloads seamlessly between the on-prem network 102 and the cloud network 104 in the public cloud computing environment, and thus, allows workloads to be transferred from the on-prem network 102 to the cloud network 104 when a disaster recovery event occurs at the on-prem network. In an embodiment, on-prem network 102 may be controlled and operated by a particular enterprise or business organization, while the cloud network 104 may be operated by a cloud computing service provider and exposed as a service available to an account holder or tenant, which may be the particular enterprise or another enterprise.

The on-prem and cloud networks 102 and 104 of the hybrid cloud system 100 include computing and/or storage resources to support a number of virtual computing instances 112A and 112B. As used herein, a VCI can be any isolated software entity that can run on a computer system, such as a software application, a software process, a virtual machine (VM) or a virtual container. A VM is an emulation of a computer system in the form of a software computer that, like a physical computer, can run an operating system and applications. Thus, a VM can be considered to be a virtual computer. A VM may be comprised of a set of specification and configuration files and is backed by the physical resources of a physical host computer. An example of such a VM is a VM created using VMware vSphere® solution made commercially available from VMware, Inc of Palo Alto, Calif. A virtual container is a package that relies on virtual isolation to deploy and run applications that access a shared operating system (OS) kernel. An example of a virtual container is a virtual container created using a Docker engine made available by Docker, Inc.

As shown in FIG. 1, the on-prem network 102 of the hybrid cloud system 100 includes one or more host computer systems ("hosts") 114, which can be viewed as a cluster of hosts. The hosts 114 may be constructed on a server grade hardware platform 116, such as an x86 architecture platform. As shown, the hardware platform of each host may include conventional components of a computing device, such as one or more processors (e.g., CPUs) 118, memory 120, a network interface 122, and storage 124. The processor 118 can be any type of a processor, such as a central processing unit (CPU). The memory 120 is volatile memory used for retrieving programs and processing data. The memory 120 may include, for example, one or more random access memory (RAM) modules. The network interface 122 enables the host 114 to communicate with another device via a communication medium, such as a physical network 126 within the on-prem network 102. The physical network 126 may include physical hubs, physical switches and/or physical routers that interconnect the hosts 114 and other components in the on-prem network 102. The network interface 122 may be one or more network adapters, such as a Network Interface Card (NIC). The storage 124 represents local storage devices (e.g., one or more hard disks, flash memory modules, solid state disks and optical disks) and/or a storage interface that enables the host 114 to communicate with one or more network data storage systems. Example of a storage interface is a host bus adapter (HBA) that couples the host 114 to one or more storage arrays, such as a storage area network (SAN) or a network-attached storage (NAS), as well as other network data storage systems. The storage 124 is used to store information, such as executable instructions, virtual disks, configurations and other data, which can be retrieved by the host 114.

Each host 114 may be configured to provide a virtualization layer that abstracts processor, memory, storage and networking resources of the hardware platform 116 into the virtual computing instances, e.g., the VMs 112A, that run concurrently on the same host. The VMs run on top of a software interface layer, which is referred to herein as a hypervisor 128, that enables sharing of the hardware resources of the host by the VMs. One example of the hypervisor 128 that may be used in an embodiment described herein is a VMware ESXi™ hypervisor provided as part of the VMware vSphere® solution made commercially available from VMware, Inc. The hypervisor 128 may run on top of the operating system of the host or directly on hardware components of the host. For other types of virtual computing instances, the host 114 may include other virtualization software platforms to support those computing entities, such as Docker virtualization platform to support software containers. In the illustrated embodiment, the host 114 also includes a virtual network agent 130. The virtual network agent 130 operates with the hypervisor 128 to provide virtual networking capabilities, such as bridging, L3 routing, L2 Switching and firewall capabilities, so that software defined networks or virtual networks can be created. The virtual network agent 130 may be part of a VMware NSX® logical network product installed in the host 114 ("VMware NSX" is a trademark of VMware, Inc.). In a particular implementation, the virtual network agent 130 may be a virtual extensible local area network (VXLAN) endpoint device (VTEP) that operates to execute operations with respect to encapsulation and decapsulation of packets to support a VXLAN backed overlay network.

As illustrated in FIG. 1, the on-prem network 102 further includes a virtualization manager 132, a software-defined network (SDN) manager 134, an SDN controller 136, a cloud service manager (CSM) 138 and a primary site recovery manager (SRM) 140 that communicate with the hosts 114 via a management network 142. In an embodiment, these management components are implemented as computer programs that reside and execute in one or more computer systems, such as the hosts 114, or in one or more virtual computing instances, such as the VMs 112A running on the hosts.

The virtualization manager 132 is configured to carry out administrative tasks for the on-prem network 102, including managing the hosts 114, adding and deleting hosts from the cluster of hosts, managing the VCIs (e.g., the VMs 112A) running on the hosts, provisioning new VCIs, migrating VCIs from one host to another host, and load balancing between the hosts within the on-prem network. One example of the virtualization manager 128 is the VMware vCenter Server® product made available from VMware, Inc.

The virtualization manager 132 includes a resource manager 144 that manages resources in the on-prem network 102. The resource manager 144 monitors the current usage of resources in the on-prem network 102, including resource utilizations by VCIs (e.g., the VMs 112A) running on the hosts 114. In particular, the resource manager 144 may monitor CPU, memory and storage utilizations in the on-prem network 102. These resource utilizations represent CPU, memory and storage requirements of the workloads (e.g., the VMs 112A) running on the on-prem network. As described in more detail below, when a disaster recovery event occurs at the on-prem network 102, the resource manager 144 sends a well-informed notification to the cloud network 104 that includes current resource usages or demands at the on-prem network 102 so that the cloud network can be efficiently and effectively scaled up to support the workloads that will need to be handled by the cloud network.

The SDN manager 134 is configured to provide a graphical user interface (GUI) and Representation Sate Transfer (REST) application programming interfaces (APIs) for creating, configuring, and monitoring SDN components, such as logical switches, and edge services gateways in the on-prem network 102. The SDN manager allows configuration and orchestration of logical network components for logical switching and routing, networking and edge services, and security services and distributed firewall (DFW). One example of the SDN manager is the NSX manager of VMware NSX product.

The SDN controller 136 is a distributed state management system that controls virtual networks and overlay transport tunnels in the on-prem network 102. In an embodiment, the SDN controller is deployed as a cluster of highly available virtual appliances that are responsible for the programmatic deployment of virtual networks across the hybrid cloud system 100. The SDN controller is responsible for providing configuration to other SDN components, such as the logical switches, logical routers, and edge devices. One example of the SDN controller is the NSX controller of VMware NSX product.

The CSM 138 is configured to provide a graphical user interface (GUI) and REST APIs for onboarding, configuring, and monitoring an inventory of public cloud constructs, such as VMs in the public cloud computing environment 106. In an embodiment, the CSM is implemented as a virtual appliance running in any computer system. One example of the CSM is the CSM of VMware NSX product.

The primary site recovery manager (SRM) 140 controls various operations at the on-prem network 102 to provide disaster protection. As an example, the primary site recovery manager may control processes for preparing the on-prem network 102 for disaster recovery, including processes for collecting the recovery-specific metadata from various sources at the on-prem network. In addition, the primary site recovery manager may detect disaster recovery events, such as hardware and/or software failures at the on-prem network 102, and notify management modules at the on-prem network. The management modules that may be notified include the virtualization manager 132. In an embodiment, the resource manager 144 running in the virtualization manager 132 may also receive the notification or detect the notification from the primary site recovery manager 140 by monitoring messages in the virtualization manager 132.

The on-prem network 102 further includes a network connection appliance 146 and a public network gateway 148. The network connection appliance 146 allows the on-prem network 102 to connect to the public cloud computing environment 106 through the direct connection 110, which may be a virtual private network (VPN), Amazon Web Services® (AWS) Direct Connect or Microsoft® Azure® ExpressRoute connection. The public network gateway 148 allows the on-prem network 102 to connect to the public cloud computing environment 106 through the network 108, which may include the Internet. The public network gateway 148 may manage external public Internet Protocol (IP) addresses for network components in the on-prem network 102, route traffic incoming to and outgoing from the on-prem network 102 and provide networking services, such as firewalls, network address translation (NAT), and dynamic host configuration protocol (DHCP). In some embodiments, the on-prem network 102 may include only the network connection appliance 146 or the public network gateway 148.

The public cloud computing environment 106 of the hybrid cloud system 100 is configured to support public clouds 150 in which the cloud network 104 can be deployed. These public clouds 150 can be provided to various tenants, which may be business enterprises. As an example, the public cloud computing environment 106 may be AWS or Azure cloud and the public clouds 150 may be VMware public clouds.

The public cloud 150 includes a network connection appliance 152, a public network gateway 154, a public cloud gateway 156 and the cloud network 104. Although only one cloud network 104 is illustrated in FIG. 1, the public cloud 150 may support multiple cloud networks, similar to the cloud network 104. The network connection appliance 152 is similar to the network connection appliance 146. Thus, the network connection appliance 152 allows the public cloud 150 in the public cloud computing environment 106 to connect to the on-prem network 102 through the direct connection 110. The public network gateway 154 is similar to the public network gateway 148. The public network gateway 154 allows the public cloud 150 to connect to any other network, such as the on-prem network 102, through the network 108. The public network gateway 154 may manage external public IP addresses for network components in the public cloud 150, route traffic incoming to and outgoing from the public cloud and provide networking services, such as firewalls, NAT and DHCP. In some embodiments, the public cloud 150 may include only the network connection appliance 152 or the public network gateway 154.

The public cloud gateway 156 of the public cloud 150 is connected to the network connection appliance 152 and the public network gateway 154 to route data traffic from and to the cloud network 104 via the network connection appliance 152 or the public network gateway 154.

The cloud network 104 is a computing environment that is similar to the on-prem network 102, and thus, can function as a secondary or backup disaster recovery site for the on-prem network. Similar to the on-prem network 102, the cloud network 104 includes a virtualization manager with a resource manager, an SDN manager, an SDN controller, and a secondary site recovery manager (SRM) 166, and VCIs, such as VMs 112B. The virtualization manager 158, the SDN manager 162, the SDN controller and the site recover manager 166 of the cloud network 104 are similar to the virtualization manager 132, the SDN manager 134, the SDN controller 136 and the site recovery manager 140 of the on-prem network 102, but are designed or programmed to operate in a public cloud environment.

In the illustrated embodiment, the components in the cloud network 104 are implemented as software running on hardware resources 168 provided by a cloud infrastructure 176, which includes cloud management software and hardware (including host computers and storage) for the entire public cloud computing environment 106. The hardware resources 168 include compute resources 170, such as CPU and memory resources, and storage resources 172, such as storage disk resources, which are provided by a cluster of host computers ("hosts") 174 provisioned to the cloud network 104 from the cloud infrastructure 176. In an embodiment, the storage resources 172 provisioned to the cloud network 104 are local storages of the provisioned hosts that are used to form a virtual storage area network (SAN). In a particular implementation, the virtual SAN formed using the storage resources 172 provisioned to the cloud network 104 is a virtual SAN created using vSAN product made available from VMware, Inc. The compute and storage resources 170 and 172 allocated to the cloud network 104 support the workloads (e.g., the VMs 112B) running on the cloud network. Thus, additional hardware resources are needed on the cloud network 104 when the resource demands of the workloads exceed the current hardware resources.

The virtualization manager 158 is configured to carry out administrative tasks for the cloud network 104, including managing the hosts 174, adding and deleting hosts from the cluster of hosts 174, managing the VCIs (e.g., the VMs 112B) running on the hosts 174, provisioning new VCIs, migrating VCIs from one host to another host, and load balancing between the hosts within the cloud network. One example of the virtualization manager 128 is the VMware vCenter Server® product for a public cloud environment.

Similar to the resource manager 144 of the on-prem network 102, the resource manager 160 of the cloud network 104 can monitor the current usage of resources in the cloud network, including resource utilizations by VCIs (e.g., the VMs 112B) running on the hosts 174. In particular, the resource manager 144 may monitor CPU, memory and storage utilizations in the cloud network 104. These resource utilizations represent CPU, memory and storage requirements of the workloads (e.g., the VMs 112B) running on the cloud network 104. The resource manager 160 may operate in different modes of operations. In some operational modes, the resource manager 160 makes a recommendation to scale out or scale in the cluster of host computers 174 based on the resource utilizations in the cloud network 104. In another operational mode, the resource manager 160 makes a scale-out recommendation to scale out the cloud network 104 in response to a disaster recovery notification from the resource manager 144 of the on-prem network 102, which includes resource demands of the workloads at the on-prem network so that the same workloads can be supported at the cloud network 104. These recommendations are transmitted to an autoscaler engine 178 that executes a scale-up or scale-in operation, which may require interfacing with the cloud infrastructure 176 to acquire additional resources or remove excess resources for the cloud network 104. The resource manager 160 is described in more detail below with respect to scaling operations.

The SDN manager 162 is configured to provide a graphical user interface (GUI) and REST APIs for creating, configuring, and monitoring SDN components, such as logical switches, and edge services gateways in the cloud network 104. The SDN manager 162 allows configuration and orchestration of logical network components for logical switching and routing, networking and edge services, and security services and distributed firewall (DFW). One example of the SDN manager is the NSX manager of VMware NSX product for a public cloud environment.

The SDN controller 164 is a distributed state management system that controls virtual networks and overlay transport tunnels in the cloud network 104. In an embodiment, the SDN controller 164 is deployed as a cluster of highly available virtual appliances that are responsible for the programmatic deployment of virtual networks across the hybrid cloud system 100. The SDN controller 164 is responsible for providing configuration to other SDN components, such as the logical switches, logical routers, and edge devices. One example of the SDN controller is the NSX controller of VMware NSX product for a public cloud environment.

The secondary site recovery manager (SRM) 166 controls various operations at the cloud network 104 for disaster recovery, similar to the primary site recovery manager 140 for the on-prem network 102. As an example, the secondary site recovery manager 166 controls processes for preparing the cloud network 104 for disaster recovery and communicating with the primary site recovery manager 140 to coordinate disaster recovery processes between the on-prem network 102 and the cloud network 104.

The resource manager 160 running in the cloud network 104 is further described with respect to scaling operations. With respect to providing scaling recommendations, the resource manager 160 may operate in different modes, which include a standard scaling mode, a rapid scaling mode and a recommendation scaling mode. The standard and rapid scaling modes are statistical based modes, which depend on the usage of the resources in the cloud network 104. The recommendation scaling mode is based on recommendations or information from the resource manager running on another network, such as the resource manager 144 running on the on-prem network 102.

In the standard and rapid scaling modes, the resource manager 160 runs a scaling algorithm periodically, e.g., every 5 minutes, and uses various parameters to make the appropriate scaling recommendations. These parameters include (1) minimum and maximum numbers of hosts the scaling algorithm should use for scaling up or scaling down, (2) minimum and maximum thresholds for CPU, memory and storage utilizations such that host allocation is optimized for cost or performance, (3) exponentially weighted moving average (EWMA) scale out and scale down weights, and (4) an incremental number of hosts to scale up in parallel for each scale-up recommendation.

A scale-out recommendation is generated by the resource manager 160 when any of CPU, memory, or storage utilizations remains consistently above their maximum thresholds. For example, if storage utilization goes above the high threshold but memory and CPU utilizations remain below their respective thresholds, a scale-out recommendation is generated. A scale-in recommendation is generated by the resource manager 160 when CPU, memory, and storage utilizations all remain consistently below their minimum thresholds.

The speed at which the scale up or scale down recommendations are made by the resource manager 160 depends on the EWMA weights. In an embodiment, the following equations are used for making the scaling recommendations by the resource manager 160:

$$\text{scale-out-EWMA} = (1-\text{scale-out-weight})*\text{scale-out-EWMA}_{previous} + \text{scale-out-weight}*\text{resource-current-demand}, \quad \text{(Equation 1)}$$

$$\text{scale-down-EWMA} = (1-\text{scale-down-weight})*\text{scale-down-EWAM}_{previous} + \text{scale-down-weight}*\text{resource-current-demand}. \quad \text{(Equation 2)}$$

Using Equation 1, the resource manager 160 will generate a scale-out recommendation in about two iterations of the scaling algorithm if the EWMA scale-out weight is set to be around 50%. The following table shows the number (N) of iterations needed to reach 90% and 100% for different EWMA scale-out weights when the scaling algorithm is executed every 5 minutes.

| EWMA Weight | N (0% to 100%) | N (50% to 90%) |
| --- | --- | --- |
| 0.5 | 3 (15 minutes) | 2 (10 minutes) |
| 0.6 | 2 (10 minutes) | 1 (5 minutes) |
| 0.7 | 1 (5 minutes) | 1 (5 minutes) |
| 0.8 | 1 (5 minutes) | immediate |

The incremental number of hosts to scale up in parallel for each scale-up recommendation is a parameter that determines how rapidly a cluster of hosts can be scaled up using the scale-up recommendations from the resource manager 160. As an example, if this parameter is one (1), then only one host will be added to the cluster in response to each scale-up recommendation made by the resource manager 160. As another example, if this parameter is four (4), then four hosts will be added to the cluster in parallel in response to each scale-up recommendation made by the resource manager 160, Thus, this parameter determines how rapidly a cluster can be scaled up to a certain size (total number of hosts) using the scale-up recommendations. As this number is increased, the pace of scale-up operations is increased by provisioning more hosts for each scale-up operation.

For the standard scaling mode of the resource manager 160, the minimum and maximum numbers of hosts the scaling algorithm should use for scaling up or scaling down are set to four (4) and thirty-two (32), respectively. The EWMA weights for CPU, memory and storage are set as 30% for scale out and 10% for scale in. For the thresholds, the minimum and maximum CPU thresholds are set at 50% and 90%, respectively, the minimum and maximum memory thresholds are set at 50% and 80%, respectively, and the minimum and maximum storage thresholds are set at 20% and 70%, respectively. Lastly, the incremental number of hosts to scale up in parallel for each scale up recommendation is set to one (1).

For the rapid scaling mode of the resource manager 160, the minimum and maximum numbers of hosts the scaling algorithm should use for scaling up or scaling down are set to four (4) and thirty-two (32), respectively. The EWMA weights for CPU and memory are set as 50% for scale out and 10% for scale in, thus making it more aggressive than the standard scaling mode. The EWMA weights for storage are set as 30% for scale out and 10% for scale in. For the thresholds, the minimum and maximum CPU thresholds are set at 0% and 80%, respectively, the minimum and maximum memory thresholds are set at 0% and 70%, respectively, and the minimum and maximum storage thresholds are set at 0% and 70%, respectively. Lastly, the incremental number of hosts to scale up in parallel for each scale up recommendation is set to four (4). Thus, in the rapid scaling mode, the resources for the cloud network 104 can be increased more rapidly than in the standard scaling mode, which may be useful in disaster recovery situations.

The parameters for the standard and rapid scaling modes of the resource manager 160 are summarized in the following table.

| Parameters | Standard Scaling Mode | Rapid Scaling Mode |
| --- | --- | --- |
| CPU Thresholds | Min: 50%, Max: 90% | Min: 0%, Max: 80% |
| Memory Thresholds | Min: 50%, Max: 80% | Min: 0%, Max: 70% |
| Storage Thresholds | Min: 20%, Max: 70% | Min: 0%, Max: 70% |
| Host Limits | Min: 4, Max: 32 | Min: 4, Max: 32 |
| EWMA Weights for CPU | Scale Out: 30%, Scale In: 10% | Scale Out: 50%, Scale In: 10% |
| EWMA Weights for Memory | Scale Out: 30%, Scale In: 10% | Scale Out: 50%, Scale In: 10% |
| EWMA Weights for Storage | Scale Out: 30%, Scale In: 10% | Scale Out: 30%, Scale In: 10% |

For the recommendation scaling mode of the resource manager 160, the scaling operations are not based on EWMA weights and resource utilizations, but are rather based on resource demands or utilizations of workloads on another network from the resource manager of that network, such as the resource manager 144 of the on-prem network 102. Thus, for the recommendation scaling mode, there are no EWMA weights to set and no minimum and maximum thresholds for CPU, memory and storage. Similarly, there is no incremental number of hosts to scale up in parallel for each scale-up recommendation. Rather, the number of hosts to scale up in parallel can be the exact number of host computers that are needed to be added to the cluster of hosts in the cloud network 104 for the workload resource demands on the other network. Thus, in the recommendation scaling mode, the resources for the cloud network 104 can be quickly scaled up, which can be more efficient and effective than in the rapid scaling mode.

Figure 2A:
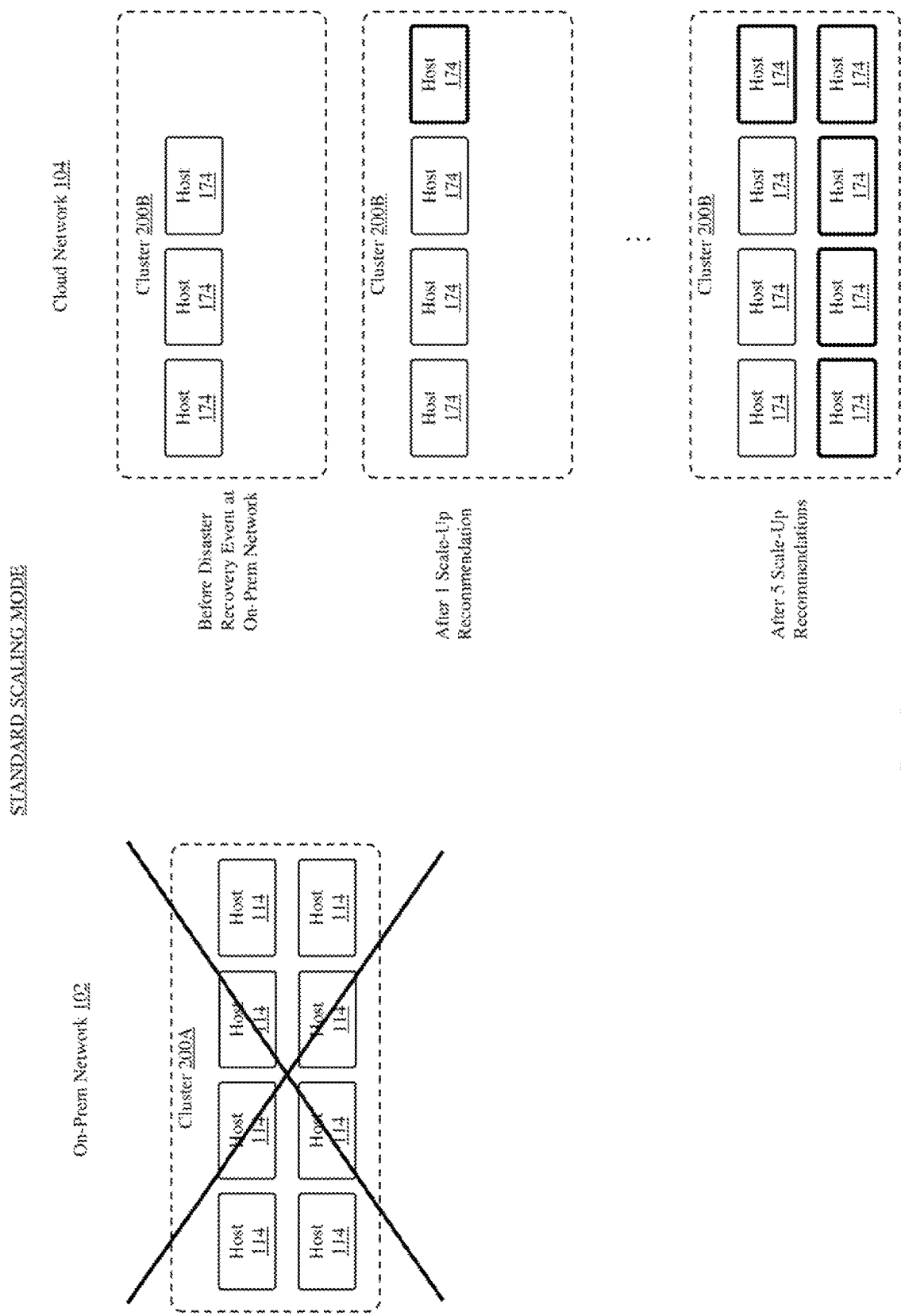
FIG. 2A illustrates a standard scaling mode of a resource manager in a cloud network of the hybrid cloud system in accordance with an embodiment of the invention.

The standard scaling mode for the resource manager 160 works well when the cloud network 104 is being used to handle workloads under ordinary conditions. However, if the cloud network 104 is being used as a backup disaster recovery site for another network, such as the on-prem network 102, then the scaling-up process of the cloud network to take over the workloads of the other network may not be sufficiently fast enough. This is explained using an example shown in FIG. 2A, where the cloud network 104 is being used as a backup disaster recovery site for the on-prem network 102. In this example, the workloads on the on-prem network 102 need a cluster 200A of eight (8) hosts and the cloud network is on standby with a cluster 200B of three (3) hosts. If a disaster recovery event occurs at the on-prem network 102 and the cloud network 104 takes over the workloads on the on-prem network, the cloud network would need five (5) additional hosts. However, using the standard scaling mode, the resource manager 144 would recommend adding only one (1) host computer at a time for each scale-up recommendation since the incremental number of hosts to scale up in parallel for each scale-up recommendation is set to one (1) for the standard scaling mode. Thus, in this example, the cloud network would reach eight (8) host computers after five (5) scale-up recommendations from the resource manager.

However, if the mode of the resource manager 160 is switched from the standard scaling mode to the rapid scaling mode, the cloud network 104 could be scaled up to eight (8) host computers more quickly. This is explained using a similar example shown in FIG. 2B, where the cloud network 104 is again being used as a backup disaster recovery site for the on-prem network 102. Again, in this example, the workloads on the on-prem network 102 also needs a cluster 200A of eight (8) hosts and the cloud network 104 is on standby with a cluster 200B of three (3) hosts. If a disaster recovery event occurs at the on-prem network 102 and the cloud network 104 takes over the workloads on the on-prem network, the cloud network would need five (5) additional hosts. Using the rapid scaling mode, the resource manager 160 would recommend adding four (4) hosts at a time for each scale-up recommendation since the incremental number of hosts to scale up in parallel for each scale-up recommendation is set to four (4) for the rapid scaling mode. Thus, in this example, the cloud network 104 would reach eleven (11) host computers after two (2) scale-up recommendations from the resource manager 160. As such, the cloud network 104 would have three (3) more hosts than needed for the workloads, but needs only two scale-up recommendations from the resource manager to scale up sufficiently to handle the workloads. The disadvantage of this approach is that the resource manager 160 at the cloud network 104 is agnostic of the scale of workloads on the on-prem network 102 that the cloud network needs to support for the disaster recovery event, and hence, the scale up of the cloud network may not be performed as quickly and as precisely as desired.

However, if the mode of the resource manager 160 is switched from the standard scaling mode to the recommendation scaling mode, the cloud network 104 could be scaled up to eight (8) host computers in a precise and quick manner. This is explained using a similar example shown in FIG. 2C, where the cloud network 104 is being used as a backup disaster recovery site for the on-prem network 102. Again, in this example, the workloads on the on-prem network need a cluster 200A of eight (8) hosts and the cloud network 104 is on standby with a cluster 200B of three (3) hosts. If a disaster recovery event occurs at the on-prem network 102 and the cloud network 104 takes over the workloads on the on-prem network, the cloud network would need five (5) additional hosts. Using the recommendation scaling mode, the resource manager 160 would receive a notification from the resource manager 144 of the on-prem network 102 that specifies that a disaster recovery event has occurred at the on-prem network and specifies the latest resource demands of the workloads on the on-prem network. Using this information, the resource manager 160 at the cloud network 104 can determine that eight (8) hosts are needed to handle the workloads on the on-prem network 102. Since the cloud network 104 already has three (3) hosts, the resource manager 160 of the cloud network would determine that five (5) additional hosts are needed and a scale-up recommendation for five (5) hosts to be added in parallel to the cloud network is issued. Thus, in this example, the cloud network would precisely reach eight (8) hosts after only one single scale-up recommendation from the resource manager 160.

Figure 2B:
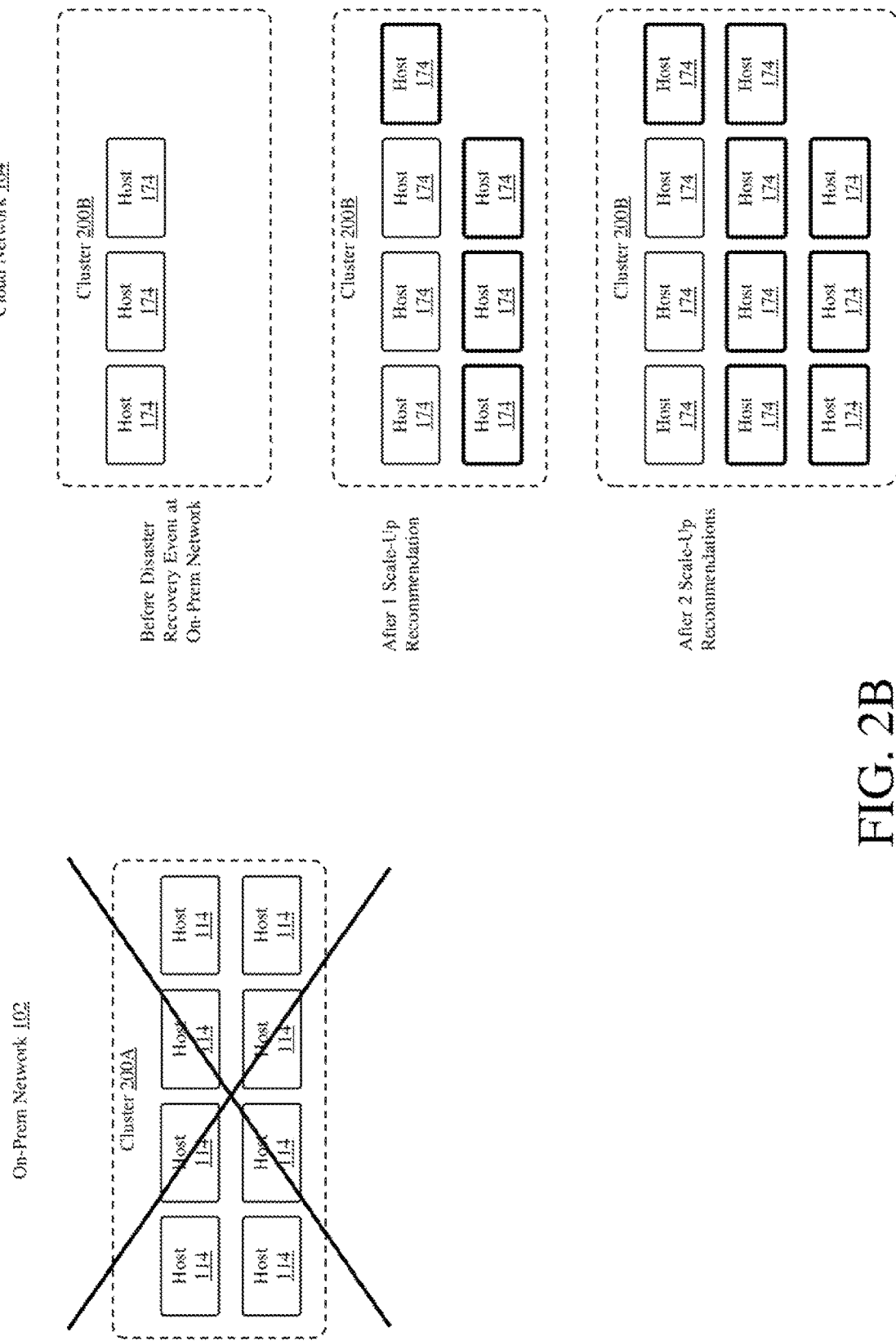
FIG. 2B illustrates a rapid scaling mode of the resource manager in the cloud network of the hybrid cloud system in accordance with an embodiment of the invention.
Figure 2C:
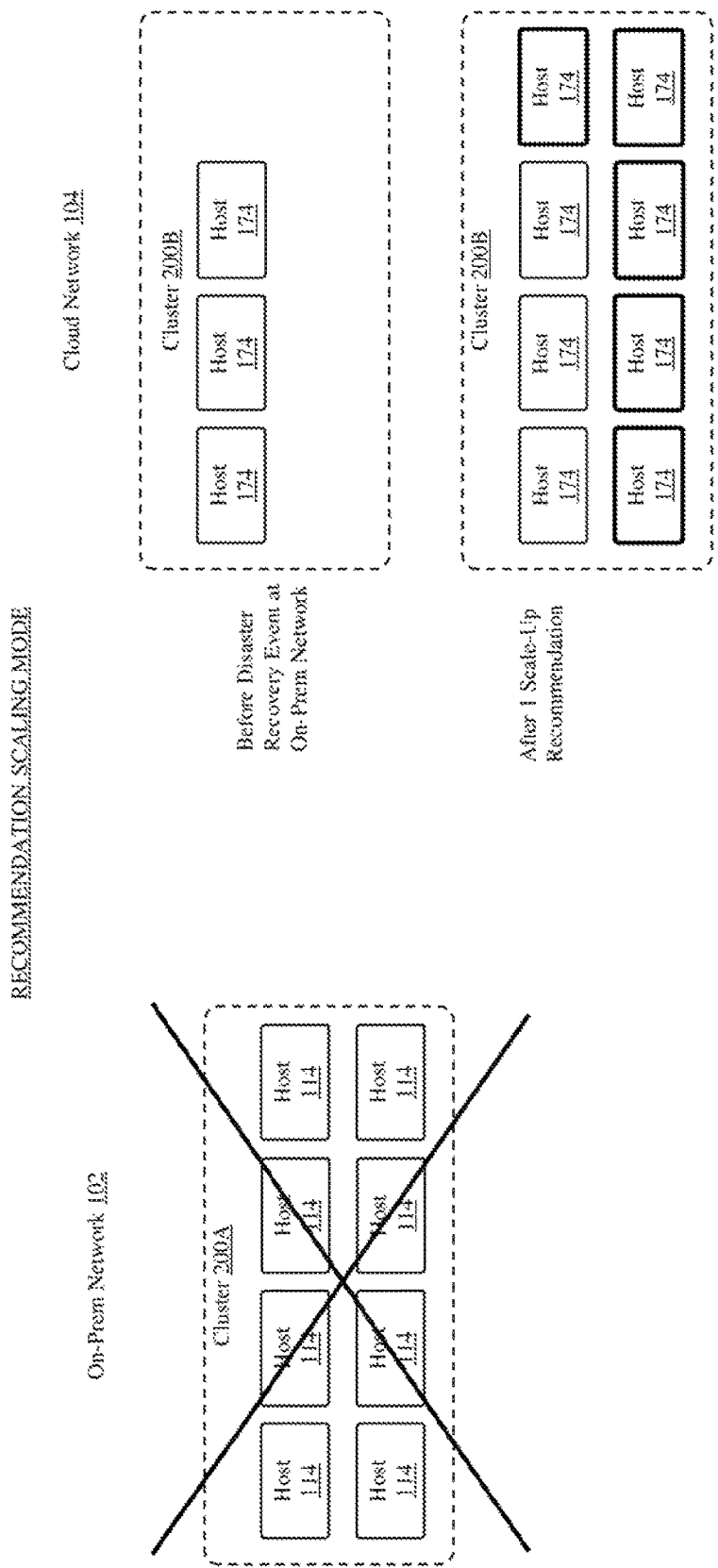
FIG. 2C illustrates a recommendation scaling mode of the resource manager in the cloud network of the hybrid cloud system in accordance with an embodiment of the invention.

Therefore, using the recommendation scaling mode, the cloud network 104 expansion will happen at a comparatively faster pace as the resource manager 160 at the cloud network 104 will know exactly how many hosts are needed for the resource demands on the on-prem network rather than statically scaling up the cloud network as and when the resource demands breach the resource thresholds on the cloud network. In addition, as illustrated in FIG. 2B, using a fixed increment of hosts for scaling up the cloud network 104 may not result in a precise number of hosts needed for the workload demands. Thus, as was the case for the example illustrated in FIG. 2B, extra hosts may be provisioned in the cloud network 104 as a result of scaling up, which translates into unnecessary costs for the operator of the on-prem network 102. Since a precise number of hosts is recommended for scaling up in the recommendation scaling mode, these unnecessary costs for extra hosts can be eradicated using the recommendation scaling mode. Thus, the recommendation scaling mode is a more cost effective approach than the rapid scaling mode. Furthermore, the use of the recommendation scaling mode will also eradicate any chances of false scale-up recommendations from the resource manager 160 of the cloud network 104 due to temporary spikes in resource demands on the cloud network, which would result in undesired scale up of the cloud network. This will be prevented since the resource manager 160 at the cloud network 104 will only react when the resource manager 144 of the on-prem network 102 sends a notification when a disaster recovery event has occurred at the on-prem network.

In some embodiments, the disaster recovery notification from the resource manager 144 of the on-prem network 102 may indicate different types of resource demands on the on-prem network. Thus, using this information, the resource manager 160 of the cloud network 104 will be able to support disaster recovery for different workloads effectively. As an example, if the on-prem network 102 has highly storage-intensive workloads, the resource manager 160 of the cloud network 104 may issue a scale-up recommendation for storage only (e.g., units of cloud storage), rather than host computers. As another example, if the on-prem network 102 has highly compute-intensive workloads, the resource manager 160 of the cloud network 104 may issue a scale-up recommendation for compute-only host computers, which are specially configured host computers that contribute to the compute capacity of the cloud network 104 immediately. If virtual SAN is used in the cloud network 104, the virtual SAN is initially prevented from claiming the disks or local storages on these compute-only host computers, but the virtual SAN can claim the disks at a later stage if the storage capability of the cloud network is not sufficient.

Figure 3:
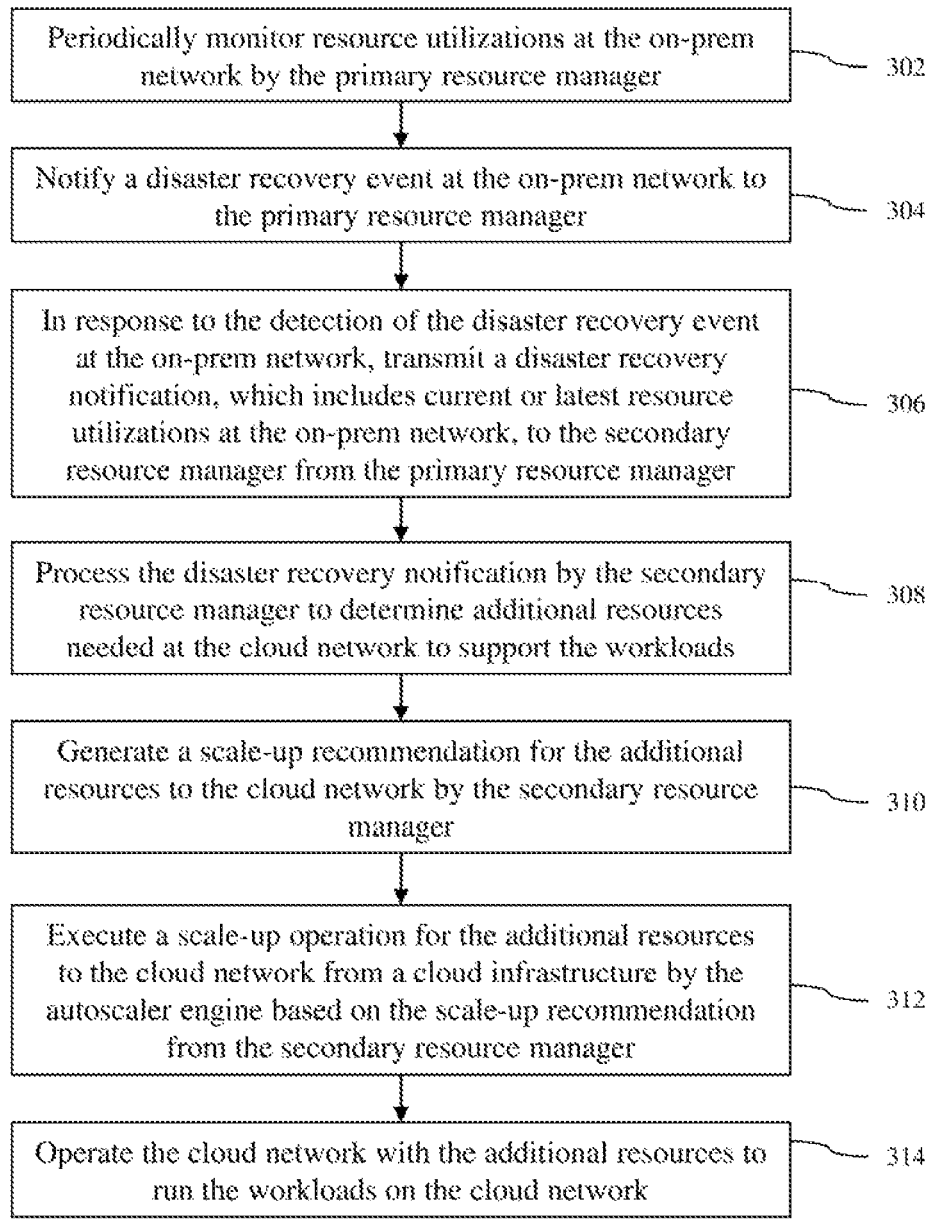
FIG. 3 is a process flow diagram of an operation of the hybrid cloud system to scale the cloud network in response to a disaster recovery event at an on-prem network in accordance with an embodiment of the invention.

Turning now to FIG. 3, a process flow diagram of an operation of the hybrid cloud system 100 to scale the cloud network 104 in response to a disaster recovery event at the on-prem network 102 in accordance with an embodiment of the invention is shown. In this embodiment, the cloud network 104 is being used as a backup disaster recovery site for the on-prem network 102. Thus, in this embodiment, the on-prem network 102 is the primary disaster recovery site and the cloud network 104 is the secondary disaster recovery site.

At step 302, resource utilizations at the on-prem network 102 are periodically monitored, e.g., every 5 minutes, by the resource manager 144 of the on-prem network 102, which is referred to herein as the primary resource manager. In an embodiment, the resource utilizations are monitored in terms of CPU, memory and storage requirements of workloads (e.g., VMs) running on the on-prem network 102.

Next, at step 304, a disaster recovery event at the on-prem network 102 is notified to the primary resource manager 144. In an embodiment, the primary resource manager 144 is notified of the disaster recovery event from the site recovery manager 140 of the on-prem network 102.

Next, at step 306, in response to the detection of the disaster recovery event at the on-prem network 102, a disaster recovery notification, which includes current or latest resource utilizations at the on-prem network, is transmitted to the resource manager 160 of the cloud network 104, which is referred to herein as the secondary resource manager, from the primary resource manager 144. The current resource utilizations at the on-prem network 102 indicate the resource requirements for scaling the cloud network 104 to take over the workloads on the on-prem network. In an embodiment, the disaster recovery notification is transmitted to the secondary resource manager 160 through a communication channel between the site recovery manager 140 of the on-prem network 102 and the site recovery manager 166 of the cloud network 104, which may be established using an API.

Next, at step 308, the disaster recovery notification is processed by the secondary resource manager 160 to determine additional resources needed at the cloud network 104 based on the current or latest resource utilizations included in the disaster recovery notification. In an embodiment, the additional resources needed at the cloud network 104 are computed by taking the current or latest resource utilizations at the on-prem network 102 and subtracting the current available resources at the cloud network 104. In a particular implementation, the additional resources needed at the cloud network 104 are computed by taking the number of hosts at the on-prem network 102 and subtracting the number of hosts at the cloud network 104.

Next, at step 310, a scale-up recommendation for the additional resources to the cloud network is generated by the secondary resource manager 160. In some situations, the scale-up recommendation may specify a number of hosts to be added to the cloud network 104 to support the resource demands at the on-prem network 102 based on the current or latest resource utilizations at the on-prem network that was included in the disaster recovery notification and the number of hosts that already exist at the cloud network. In other situations, the scale-up recommendation may specify a particular type of resources to scale up in the cloud network 104. As an example, the scale-up recommendation may only specify additional storage or a number of compute-only host computers. In some embodiments, when the disaster recovery notification is received by the secondary resource manager 160, the operational mode of the secondary resource manager is switched from a statistical based scaling mode, e.g., the standard or rapid scaling mode, to the recommendation scaling mode.

Next, at step 312, in response to the scale-up recommendation, a scale-up operation is executed by the autoscaler engine 178 for the additional resources to the cloud network 104 from the cloud infrastructure 176. In some situations, the additional resources may be a specified number of host computers, additional storage or a specified number of compute-only host computers.

Next, at step 314, the cloud network 104 is operated with the additional resources to run the workloads on the cloud network, which were previously running on the on-prem network 102. In an embodiment, after the cloud network 104 has been scaled up, the secondary resource manager 160 may be switched back to the statistical based scaling mode to scale the cloud network based on resource utilizations at the cloud network.

In an embodiment, the rapid scaling mode of the secondary resource manager 160 may be used to speed up the scaling process of the cloud network 104 when a disaster recovery event occurs at the on-prem network 102. In this embodiment, the mode of the secondary resource manager 160 may be switched to the rapid scaling mode from the standard scaling mode by a user or by a notification from a component at the on-prem network 102, such as the primary resource manager 144.

Disaster recovery usually results in a boot storm on the recovery site, e.g., the cloud network 104. In such a case, having a recommendation from the primary site resource manager can serve as the minimum resources required to host the primary site workloads at the recovery site. However, the boot storm may result in a temporary high demand that will subside once the boot storm is over. This can be classified as a prolonged spike in CPU, memory, network and storage resource usage. In accordance with embodiments of the invention, the resource manager on the recovery site can aggressively scale up the resources to handle this spike and can also be configured to revert the resources to the minimum threshold as soon as possible after the spike has reduced, e.g., hosts can be quickly scaled in (removed) from the recovery site, thus resulting in a much-optimized recovery time plus performance and lesser cost for the customers. Hence, a precise or workload-aware disaster recovery can be achieved.

Figure 4:
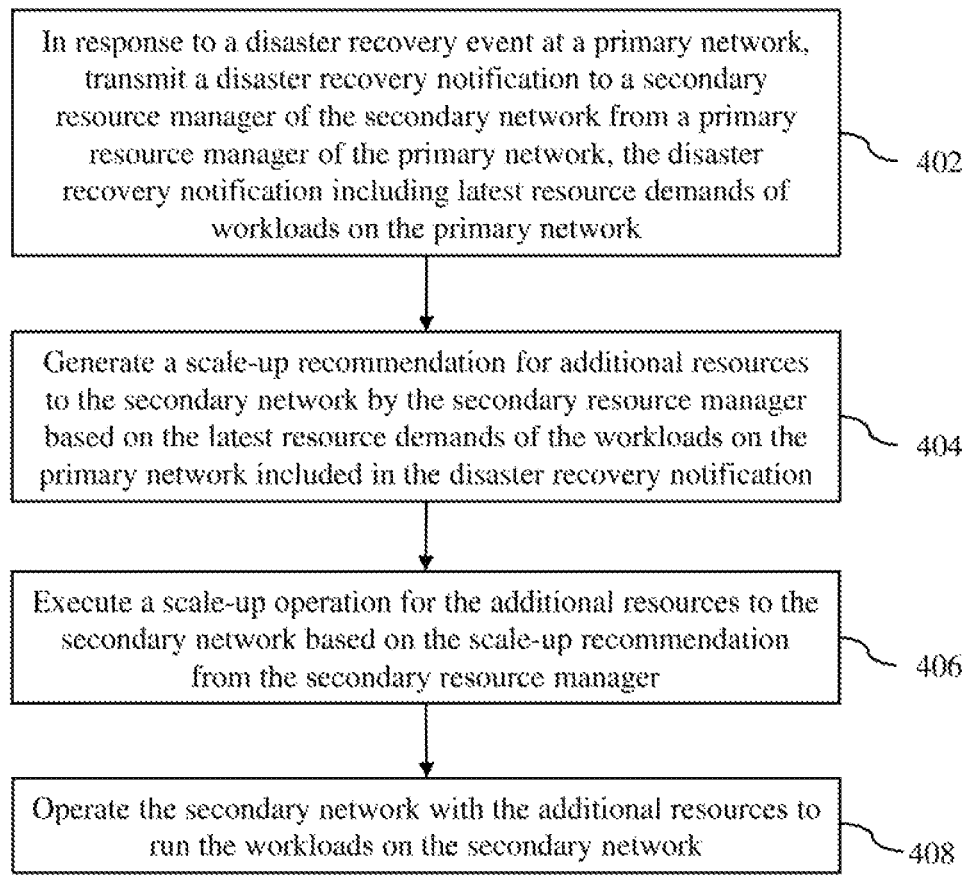
FIG. 4 is a flow diagram of a computer-implemented method for scaling resources of a secondary network for disaster recovery in accordance with an embodiment of the invention.

A computer-implemented method for scaling resources of a secondary network for disaster recovery in accordance with an embodiment of the invention is described with reference to a flow diagram of FIG. 4. At block 402, in response to a disaster recovery event at a primary network, a disaster recovery notification is transmitted to a secondary resource manager of the secondary network from a primary resource manager of the primary network. The disaster recovery notification includes latest resource demands of workloads on the primary network. At block 404, a scale-up recommendation for additional resources to the secondary network is generated by the secondary resource manager based on the latest resource demands of the workloads on the primary network included in the disaster recovery notification. At block 406, a scale-up operation for the additional resources to the secondary network is executed based on the scale-up recommendation from the secondary resource manager. At block 408, the secondary network with the additional resources is operated to run the workloads on the secondary network.

The operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random-access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for scaling resources of a secondary network for disaster recovery, the method comprising: in response to a disaster recovery event at a primary network, transmitting a disaster recovery notification to a secondary resource manager of the secondary network from a primary resource manager of the primary network, the disaster recovery notification including latest resource demands of workloads on the primary network; generating a scale-up recommendation for additional resources to the secondary network by the secondary resource manager based on the latest resource demands of the workloads on the primary network included in the disaster recovery notification during a recommendation scaling mode, including switching a mode of operation of the secondary resource manager from a statistical-based scaling mode to a the recommendation scaling mode, wherein the statistical-based scaling mode uses a fixed incremental number of host computers for a scale-up operation for each scale-up recommendation; executing a scale-up operation for the additional resources to the secondary network based on the scale-up recommendation from the secondary resource manager; and operating the secondary network with the additional resources to run the workloads on the secondary network.

2. The method of claim 1, wherein the additional resources include a plurality of host computers that are additionally needed in the secondary network to support the workloads and wherein executing the scale-up operation includes provisioning the plurality of host computers to the secondary network in parallel all at once.

3. The method of claim 1, wherein the additional resources include only storage resources that are additionally needed in the secondary network to support the workloads and wherein executing the scale-up operation includes provisioning the storage resources to the secondary network.

4. The method of claim 1, wherein the additional resources include only compute resources that are additionally needed in the secondary network to support the workloads and wherein executing the scale-up operation includes provisioning a plurality of compute-only host computers to the secondary network in parallel.

5. The method of claim 1, further comprising, after the secondary network has been scaled up with the additional resources, switching the mode of operation for the secondary resource manager from the recommendation scaling mode back to the statistical-based scaling mode.

6. The method of claim 1, wherein the primary network is an on-premises software-defined data center and the secondary network is a software-defined data center in a public cloud computing environment.

7. The method of claim 1, further comprising interacting with a site recovery manager at the primary network to detect the disaster recovery event at the primary network by the primary resource manager.

8. The method of claim 1, wherein the scale-up operation for the additional resources to the secondary network is not based on exponentially weighted moving average (EWMA) weights or resource utilizations.

9. A non-transitory computer-readable storage medium containing program instructions for scaling resources of a secondary network for disaster recovery, wherein execution of the program instructions by one or more processors of a computer system causes the one or more processors to perform steps comprising: in response to a disaster recovery event at a primary network, transmitting a disaster recovery notification to a secondary resource manager of the secondary network from a primary resource manager of the primary network, the disaster recovery notification including latest resource demands of workloads on the primary network; generating a scale-up recommendation for additional resources to the secondary network by the secondary resource manager based on the latest resource demands of the workloads on the primary network included in the disaster recovery notification during a recommendation scaling mode, including switching a mode of operation of the secondary resource manager from a statistical-based scaling mode to a the recommendation scaling mode, wherein the statistical-based scaling mode uses a fixed incremental number of host computers for a scale-up operation for each scale-up recommendation; executing a scale-up operation for the additional resources to the secondary network based on the scale-up recommendation from the secondary resource manager; and operating the secondary network with the additional resources to run the workloads on the secondary network.

10. The computer-readable storage medium of claim 9, wherein the additional resources include a plurality of host computers that are additionally needed in the secondary network to support the workloads and wherein executing the scale-up operation includes provisioning the plurality of host computers to the secondary network in parallel all at once.

11. The computer-readable storage medium of claim 9, wherein the additional resources include only storage resources that are additionally needed in the secondary network to support the workloads and wherein executing the scale-up operation includes provisioning the storage resources to the secondary network.

12. The computer-readable storage medium of claim 9, wherein the additional resources include only compute resources that are additionally needed in the secondary network to support the workloads and wherein executing the scale-up operation includes provisioning a plurality of compute-only host computers to the secondary network in parallel.

13. The computer-readable storage medium of claim 9, wherein the steps further comprise, after the secondary network has been scaled up with the additional resources, switching the mode of operation for the secondary resource manager from the recommendation scaling mode back to the statistical-based scaling mode.

14. The computer-readable storage medium of claim 9, wherein the primary network is an on-premises software-defined data center and the secondary network is a software-defined data center in a public cloud computing environment.

15. The computer-readable storage medium of claim 9, wherein the steps further comprise interacting with a site recovery manager at the primary network to detect the disaster recovery event at the primary network by the primary resource manager.

16. A system comprising: memory; and at least one processor configured to: in response to a disaster recovery event at a primary network of the system, transmit a disaster recovery notification to a secondary resource manager of a secondary network of the system from a primary resource manager of the primary network, the disaster recovery notification including latest resource demands of workloads on the primary network; generate a scale-up recommendation for additional resources to the secondary network by the secondary resource manager based on the latest resource demands of the workloads on the primary network included in the disaster recovery notification during a recommendation scaling mode; execute a scale-up operation for the additional resources to the secondary network based on the scale-up recommendation from the secondary resource manager; and operate the secondary network with the additional resources to run the workloads on the secondary network, wherein the at least one processor is configured to switch a mode of operation of the secondary resource manager from a statistical-based scaling mode to a the recommendation scaling mode, wherein the statistical-based scaling mode uses a fixed incremental number of host computers for a scale-up operation for each scale-up recommendation.

17. The system of claim 16, wherein the additional resources include a plurality of host computers that are additionally needed in the secondary network to support the workloads and wherein the at least one processor is configured to execute the scale-up operation that provisions the plurality of host computers to the secondary network in parallel all at once.

18. The system of claim 16, wherein the additional resources include only storage resources or only compute resources that are additionally needed in the secondary network to support the workloads and wherein the at least one processor is configured to execute the scale-up operation that provisions the storage resources to the secondary network or a plurality of compute-only host computers to the secondary network in parallel.

19. The system of claim 16, wherein the primary network is an on-premises software-defined data center and the secondary network is a software-defined data center in a public cloud computing environment.

20. The system of claim 16, wherein the at least one processor is configured to interact with a site recovery manager at the primary network to detect the disaster recovery event at the primary network by the primary resource manager.

* * * * *